(12) United States Patent
Lui et al.

(10) Patent No.: US 9,900,061 B1
(45) Date of Patent: Feb. 20, 2018

(54) WEARABLE PASSIVE SCANNING DEVICE

(71) Applicant: Amazon Technologies, Inc., Seattle, WA (US)

(72) Inventors: Tak Keung Joseph Lui, Bellevue, WA (US); David Henry Clark, Bellevue, WA (US); Jeremy Dashe, Bainbridge Island, WA (US); Oleg Kantor, Kirkland, WA (US); Maju Cheruvallil Kuruvilla, Issaquah, WA (US); Alton Paul Werronen, Auburn, WA (US); Nelson Ramon, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/281,775

(22) Filed: Sep. 30, 2016

(51) Int. Cl.
| | | |
|---|---|---|
| *H04B 5/00* | (2006.01) |
| *G08B 6/00* | (2006.01) |
| *G08B 5/22* | (2006.01) |
| *H04W 4/00* | (2018.01) |
| *H04W 4/02* | (2018.01) |
| *G06K 19/077* | (2006.01) |
| *G06K 19/06* | (2006.01) |
| *G06K 7/14* | (2006.01) |
| *H04B 1/3827* | (2015.01) |

(52) U.S. Cl.
CPC ......... *H04B 5/0062* (2013.01); *G06K 7/1413* (2013.01); *G06K 19/06028* (2013.01); *G06K 19/07762* (2013.01); *G08B 5/226* (2013.01); *G08B 6/00* (2013.01); *H04W 4/008* (2013.01); *H04W 4/02* (2013.01); *H04B 2001/3861* (2013.01)

(58) Field of Classification Search
CPC .............. G06K 17/0022; H04B 17/318; H04B 5/0062; H04W 4/008; H04W 4/02
See application file for complete search history.

(56) References Cited

U.S. PATENT DOCUMENTS

| | | | |
|---|---|---|---|
| 8,280,547 B2 | 10/2012 | D'andrea et al. | |
| 9,087,314 B2 | 7/2015 | Hoffman et al. | |
| 2013/0154809 A1* | 6/2013 | Subramanian | ........ G01S 13/878 340/10.42 |
| 2016/0062345 A1 | 3/2016 | Stubbs et al. | |

\* cited by examiner

*Primary Examiner* — Curtis Odom
(74) *Attorney, Agent, or Firm* — Knobbe Martens Olson & Bear LLP

(57) ABSTRACT

Features are disclosed for a wearable scanning device that can passively initiate scanning for wireless identifiers such as RFID tags. The wearable scanning device may include a force sensor, an accelerometer, or a motion activated switch that can initiate the scanning when detecting an action performed by an associate (e.g., lifting) without an express intent from the associate to scan.

21 Claims, 10 Drawing Sheets

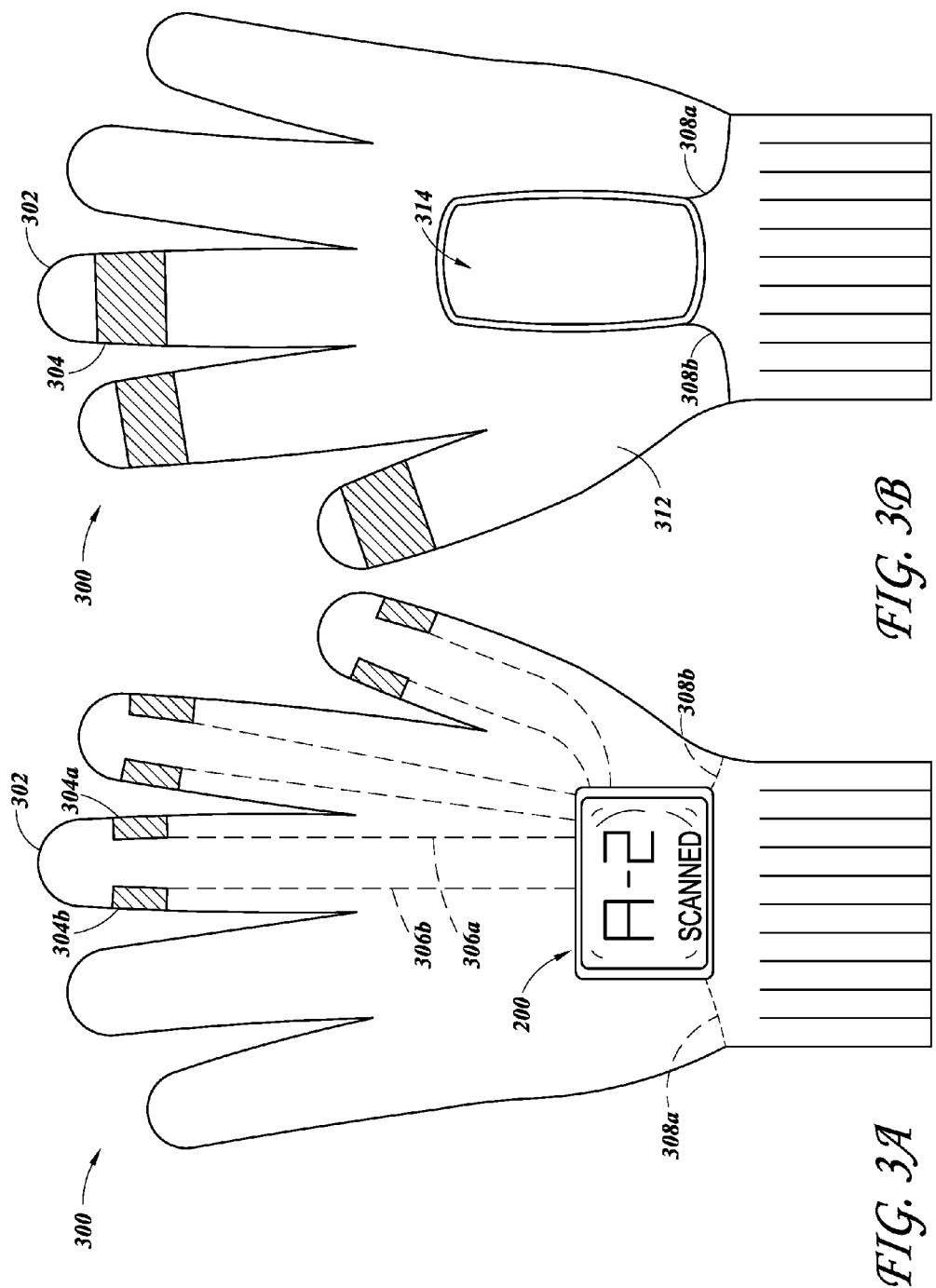

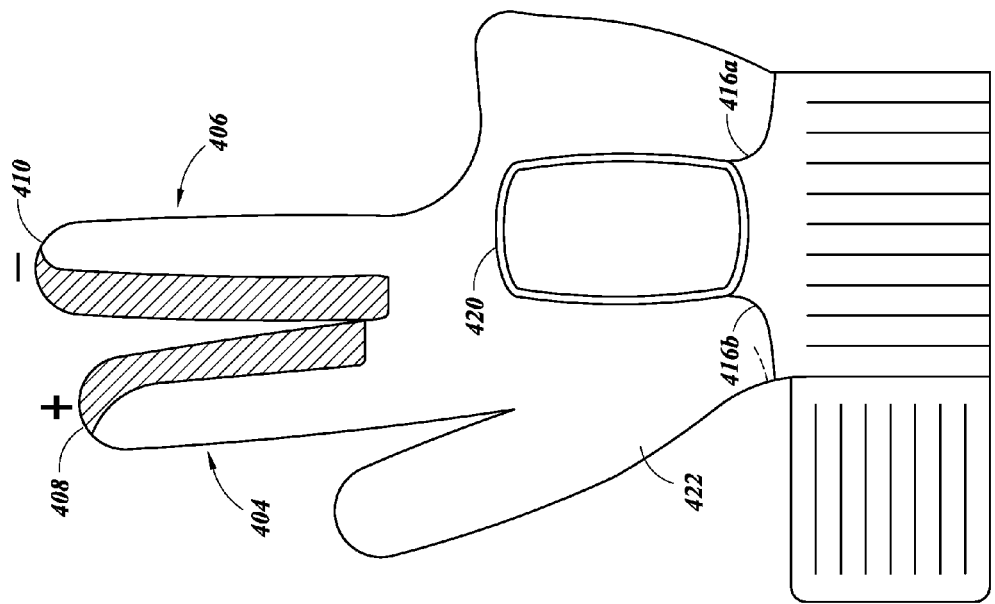
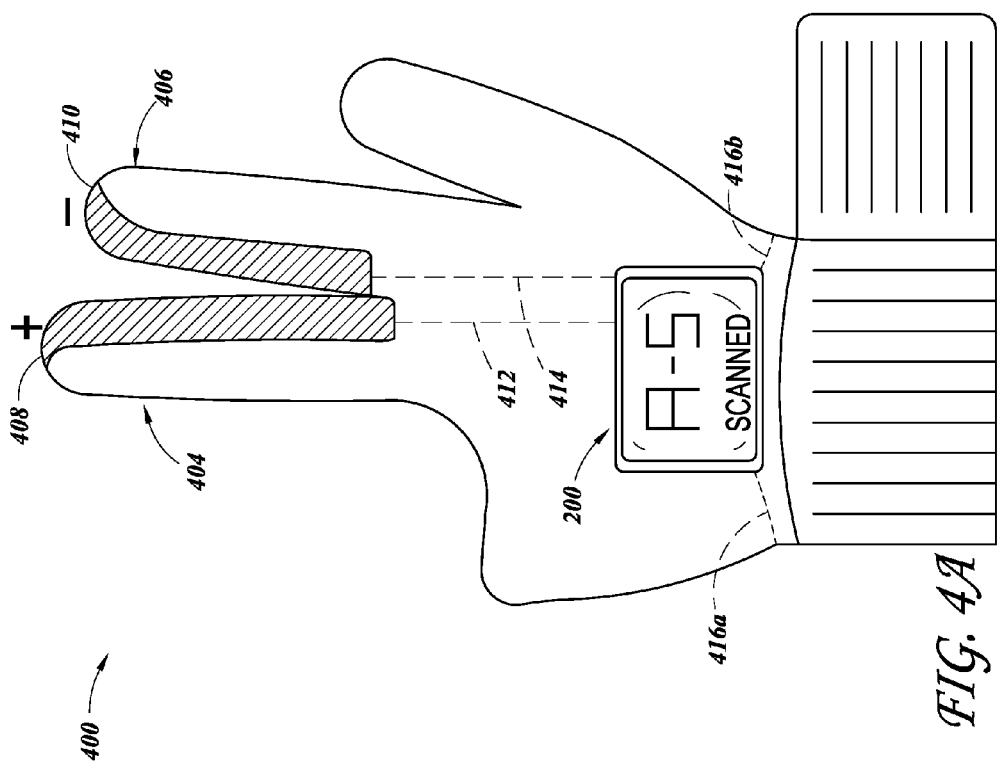

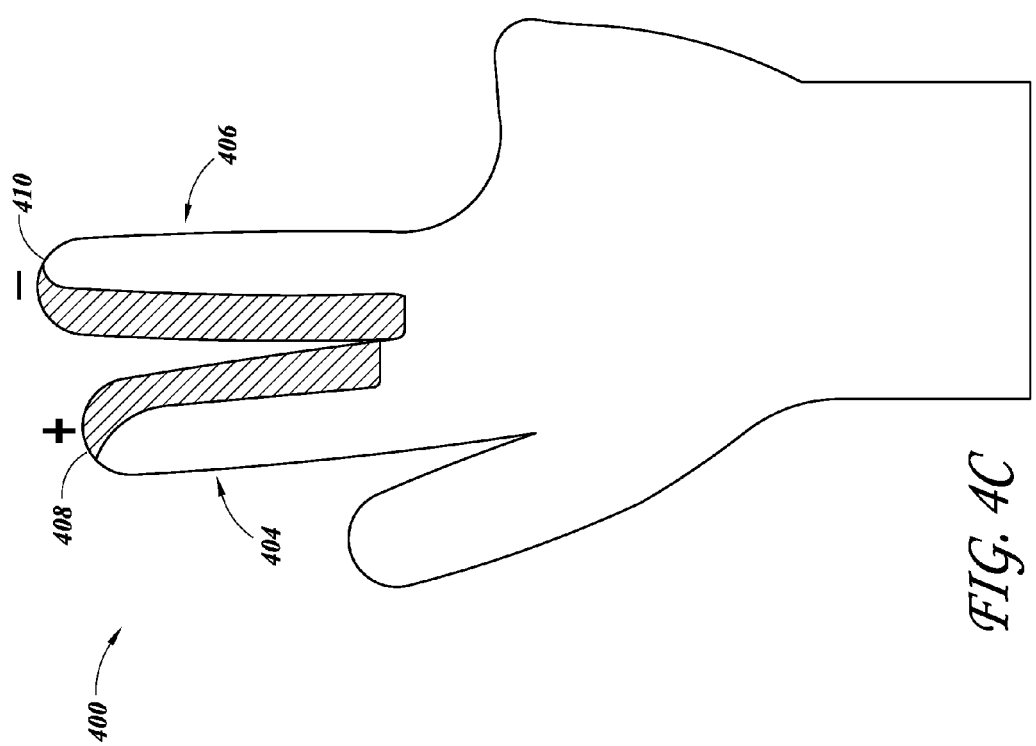

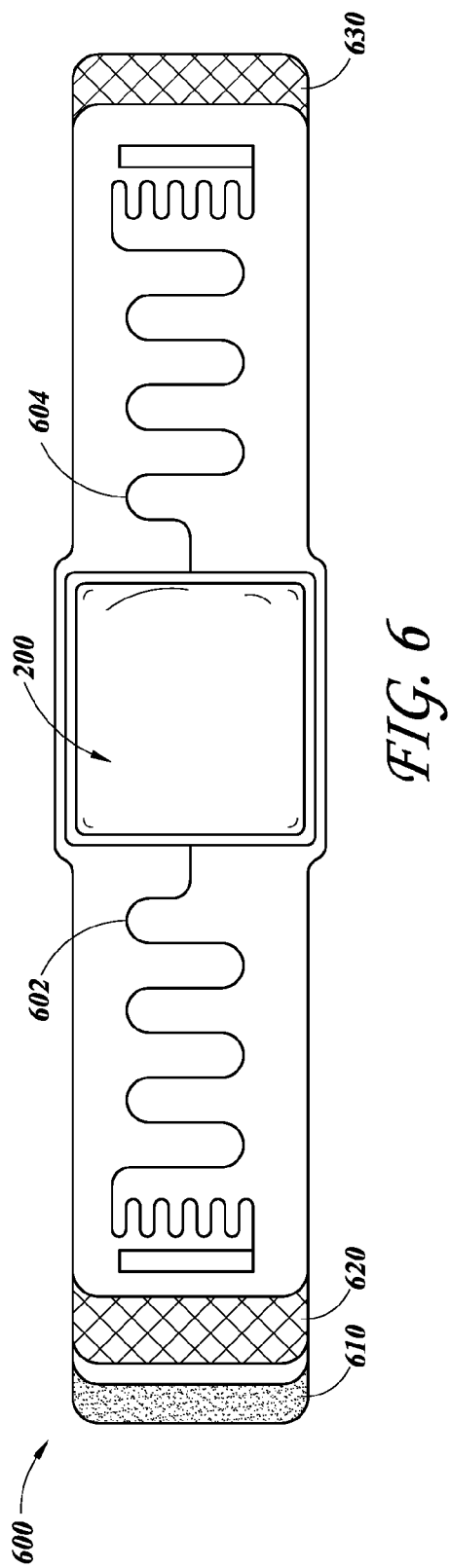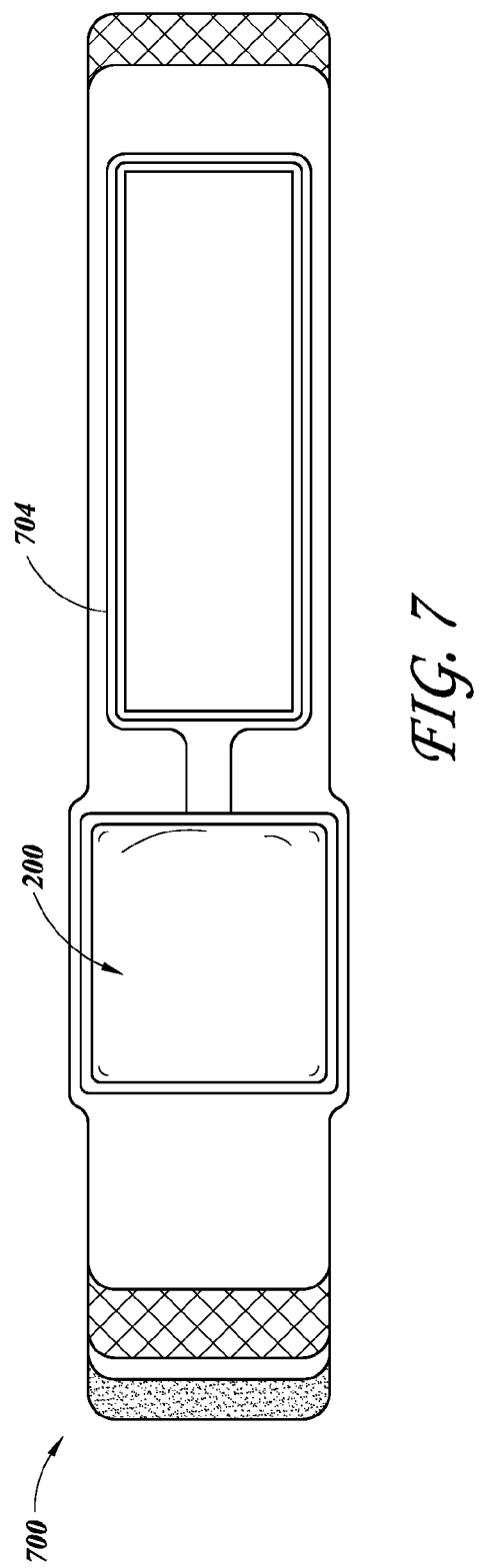

ment device 115, one or more mobile drive units 120, one or
WEARABLE PASSIVE SCANNING DEVICE

BACKGROUND

Modern inventory systems, such as those in mail order warehouses, supply chain distribution centers, airport luggage systems, and custom-order manufacturing facilities, can include a number of complex systems, including robots, automated shelving systems, radio frequency identification (RFID), and automated scheduling and routing equipment. Many systems, for example, include robots and humans that travel to shelving systems to retrieve items, or the shelves themselves, and return them to a central location for additional processing.

BRIEF DESCRIPTION OF THE DRAWINGS

Embodiments of various inventive features will now be described with reference to the following drawings. Throughout the drawings, the examples shown may re-use reference numbers to indicate correspondence between referenced elements. The drawings are provided to illustrate example embodiments described herein and are not intended to limit the scope of the disclosure.

FIG. 3A is a pictorial diagram of a top view of an example glove that may include pressure sensors and the wireless scanning device of FIG. 2A.

FIG. 3B is a pictorial diagram of a bottom view of the example glove of FIG. 3A.

FIG. 4A is a pictorial diagram of a top view of another example glove that may include a contact switch lifting sensor and the wireless scanning device of FIG. 2A.

FIG. 4B is a pictorial diagram of a bottom view of the example glove of FIG. 4A.

FIG. 4C is a pictorial diagram of the example glove of FIG. 4A with the contact switch activated.

FIG. 6 is a pictorial diagram of an example bracelet that may include an antenna and the wireless scanning device of FIG. 2A.

FIG. 7 is a pictorial diagram of another example bracelet that may include an antenna and the wireless scanning device of FIG. 2A.

DETAILED DESCRIPTION

Accurately keeping track of an item as it moves through an inventory system can ensure that humans and robots find the item when it is needed. When shipping high volumes of packages, packages may be stacked on pallets or other locations. Confirming that a package is in the correct location usually involves bar code scanning. There may be two bar code scans, one for the package being stacked and one for the destination to for which it is being stacked. The need to perform two scans to track an item in the inventory system presents two possible points of failure for maintaining an accurate location for the item.

The inventory system may include a wireless scanning device such as a WI-FI® enabled radio frequency identifier (RFID) reader device or a near field communication (NFC) transceiver that can be worn, for example, on the hand. The inventory system may include a positioning system precise enough to distinguish stacking locations such as a UWB-RTLS (Ultra-Wideband Real Time Location Service) system, and a communications network. The wireless scanning device may read wireless identifiers such as RFID tags. The wireless identifiers may be affixed to items, pallets, and other objects within the inventory system to facilitate identification and/or tracking of the items. The read may be triggered by a passively activated switch (e.g., a pressure sensor or location sensor) included in the wireless scanning device. The information read from the wireless identifier may be transmitted via the communication network to another device within the inventory system. The power used by the wireless scanning device to read wireless identifiers may be optimized to read identifiers in a typical area around a human worker. For example, the power may be calibrated to allow reading wireless identifiers for items and/or packages in an area the size of a pallet. This can limit stray reads while still reading the desired item or package. The power may be specified using a configuration file for the wireless scanning device. The configuration file may include one or more power levels available for scanning. In some implementations, a power level may be selected from a list of power levels based on factors such as the item being carried, the item that will be carried, the area within the workspace, an inventory holder into which the item will be placed, an inventory holder in which the item is located, location of the wireless scanning device, or other information available to the wireless scanning device. A location system may provide position data such as via UWB-RTLS. The computer network may combine the received information to determine that the package has been placed on the correct pallet or that it has not.

Figure 1:
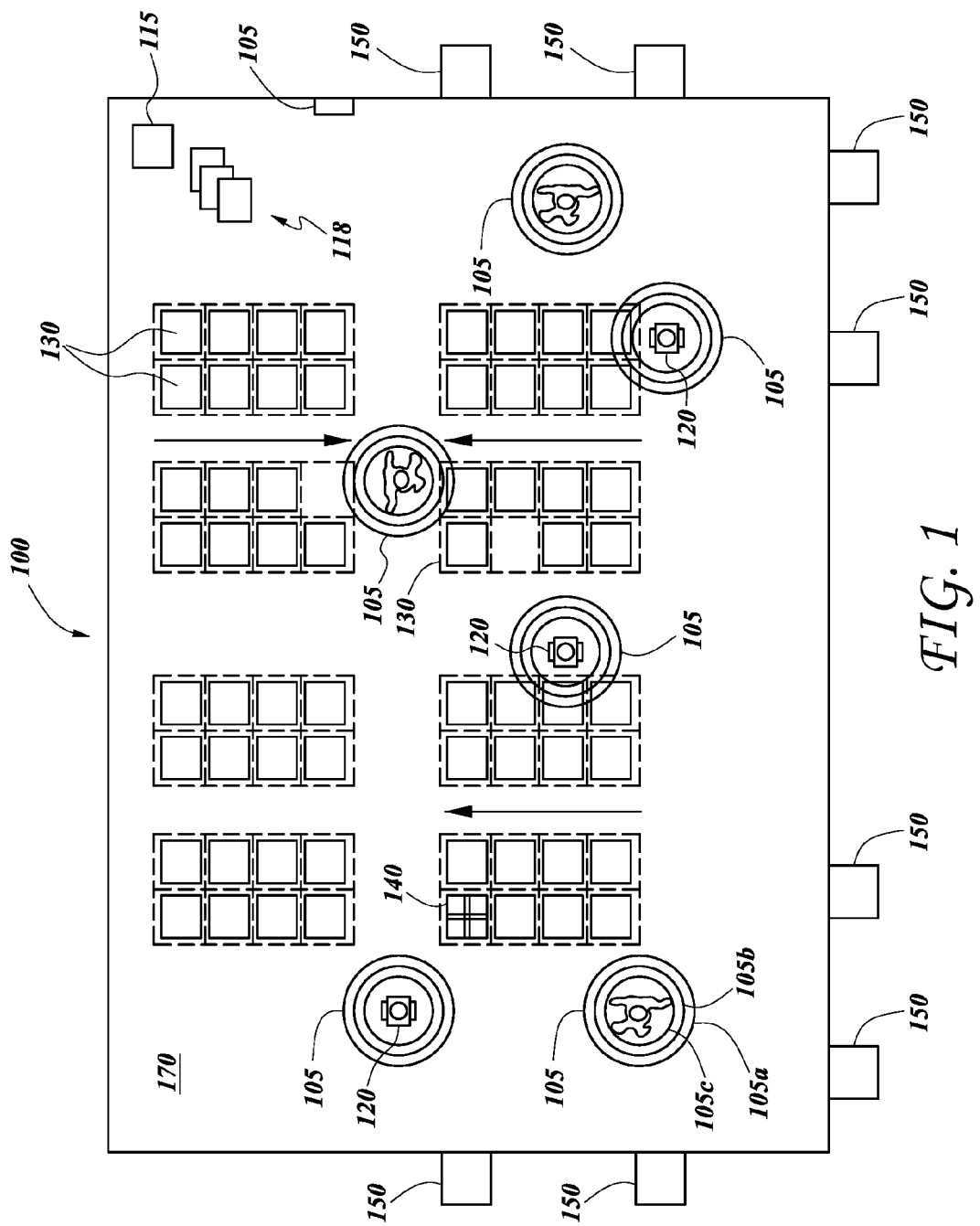
FIG. 1 is a pictorial diagram depicting an illustrative inventory system environment.

FIG. 1 is a pictorial diagram depicting an illustrative inventory system environment. FIG. 1 illustrates the components of an inventory system 100 in which items may be tracked. The inventory system 100 may include a management device 115, one or more mobile drive units 120, one or more inventory holders 130, and one or more inventory stations 150. A mobile drive unit may transport one or more of the inventory holders 130 between points within a workspace 170 in response to commands communicated by the management device 115. Each inventory holder 130 may store one or more types of inventory items. As a result, the inventory system 100 is capable of moving inventory items between locations within the workspace 170 to facilitate the entry, processing, and/or removal of inventory items from the inventory system 100 and the completion of other tasks involving inventory items.

The management device 115 may assign tasks to appropriate components of the inventory system 100 and coordinate operation of the various components in completing the tasks. These tasks may relate not only to the movement and processing of inventory items, but also to the management and maintenance of the components of the inventory system 100. The management device 115 may identify components of the inventory system 100 to perform these tasks and communicate appropriate commands and/or data to the identified components to facilitate completion of these operations.

Although shown in FIG. 1 as a single, discrete component, the management device 115 may represent multiple components and may represent or include portions of the mobile drive units 120 or other elements of the inventory system 100. Interactions between a particular mobile drive unit and the management device 115 that are described may, in some embodiments, represent peer-to-peer communication between two or more of the mobile drive units 120. The components and operation of example embodiments of the management device 115 are described in U.S. patent application Ser. No. 14/472,717, filed on Aug. 29, 2014 and titled "SAFETY COMPLIANCE FOR MOBILE DRIVE UNITS," which is incorporated herein by reference in its entirety.

A mobile drive unit may be implemented as an independent, self-powered device configured to move about the workspace 170. Further examples of inventory systems and features that may be included in an inventory system are disclosed in U.S. Pat. No. 9,087,314, issued on Jul. 21, 2015, titled "SYSTEM AND METHOD FOR POSITIONING A MOBILE DRIVE UNIT" and U.S. Pat. No. 8,280,547, issued on Oct. 2, 2012, titled "METHOD AND SYSTEM FOR TRANSPORTING INVENTORY ITEMS," each of which is incorporated herein by reference in its entirety.

The mobile drive units 120 may communicate with the management device 115 to receive information identifying selected inventory holders 130, to transmit the locations of the mobile drive units 120, or to exchange any other suitable information used by the management device 115 or the mobile drive units 120 during operation. The mobile drive units 120 may communicate with the management device 115 wirelessly and/or using wired connections between the mobile drive units 120 and the management device 115. As one example, some mobile drive units 120 may communicate with the management device 115 and/or with one another using 802.11, BLUETOOTH®, or Infrared Data Association (IrDA) standards, or any other appropriate standardized wireless communication protocol.

The inventory holders 130 may store inventory items. One or more of the inventory holders 130 may include multiple storage bins with each storage bin capable of holding one or more types of inventory items. The inventory holders 130 may include structural features to facilitate carrying, rolling, and/or otherwise moving the inventory holders 130 by mobile drive units. The inventory holder 130 may include propulsion means to supplement that provided by a mobile drive unit when moving inventory holder 130.

Inventory items 140 may hang from hooks or bars (not shown) within or on one or more of the inventory holders 130. An inventory holder may store inventory items 140 in any appropriate manner within the inventory holder and/or on the external surface of inventory holder.

A particular inventory holder 130 may be considered to be currently "storing" a particular inventory item if the inventory holder 130 currently holds one or more units of that type. As one example, the inventory system 100 may represent a warehouse facility, and inventory items may represent merchandise stored in the warehouse facility. During operation, one or more of the mobile drive units 120 may retrieve the inventory holders 130 containing one or more inventory items requested to be packed for delivery to a customer or the inventory holders 130 carrying pallets containing aggregated collections of inventory items for shipment. In some implementations, containers (e.g., boxes or packages) including completed orders may themselves represent inventory items.

The inventory system 100 may include one or more inventory stations 150. An inventory station may represent a location designated for the completion of particular tasks involving inventory items. Such tasks may include the removal of inventory items from an inventory holder, the introduction of inventory items into an inventory holder, the counting of inventory items in an inventory holder, the decomposition of inventory items (e.g., from pallet- or case-sized groups to individual inventory items), the consolidation of inventory items between inventory holders, and/or the processing or handling of inventory items in any other suitable manner.

The inventory stations 150 may represent physical locations where a particular task involving inventory items can be completed within the workspace 170. In some implementations, the inventory stations 150 may represent both the physical location and also any appropriate equipment for processing or handling inventory items, such as scanners for monitoring the flow of inventory items in and out of the inventory system 100, communication interfaces for communicating with the management device 115, and/or any other suitable item processing components.

The workspace 170 may represent an area associated with the inventory system 100 in which the mobile drive units 120 can move and/or the inventory holders 130 can be stored. For example, the workspace 170 may represent all or part of the floor of a warehouse in which the inventory system 100 operates. Although FIG. 1 shows, for the purposes of illustration, an inventory system in which the workspace 170 includes fixed, predetermined, and finite physical spaces, an inventory system may include mobile drive units and/or inventory holders that are configured to operate within a workspace that is of variable dimensions and/or an arbitrary geometry. While the workspace 170 shown in FIG. 1 is entirely enclosed in a building, the inventory system 100 may utilize one or more workspaces in which some or all of the workspaces are located outdoors, within a vehicle (such as a cargo ship), or otherwise unconstrained by any fixed structure.

The management device 115 may select appropriate components to complete particular tasks and transmit task assignment messages 118 to the selected components to trigger completion of the relevant tasks. The task assignment message 118 may include information identifying one or more tasks to be completed by at least one component of the inventory system 100. These tasks may relate to the retrieval, storage, replenishment, and counting of inventory items and/or the management of mobile drive units, inventory holders, inventory stations, and/or other components of inventory system 100. Depending on the component and the task to be completed, a particular task assignment message 118 may include information identifying locations, components, and/or actions associated with the corresponding task and/or any other appropriate information to be used by the relevant component in completing the assigned task.

The management device 115 may generate task assignment messages 118 based, in part, on inventory requests that the management device 115 receives from other components of the inventory system 100 and/or from external components in communication with the management device 115. An inventory request may identify particular operations to be completed involving inventory items stored or to be stored within the inventory system 100. For example, an inventory request may represent a shipping order specifying particular inventory items that have been purchased by a customer and that are to be retrieved from the inventory system 100 for shipment to the customer. The management device 115 may also generate task assignment messages 118 independently of such inventory requests, as part of the overall management and maintenance of the inventory system 100. For example, the management device 115 may generate one or more task assignment messages in response to the occurrence of a particular event (e.g., in response to a mobile drive unit requesting a space to park), according to a predetermined schedule (e.g., as part of a daily start-up routine), or at any appropriate time based on the configuration and characteristics of the inventory system 100. After generating one or more task assignment messages 118, the management device 115 may transmit the generated task assignment messages 118 to appropriate components for completion of the corresponding task. The relevant components may then execute their assigned tasks.

While executing a task, a mobile drive unit or human worker may carry a wireless scanning device configured to transmit and receive signals to detect wireless identifiers (e.g., RFID tags) within a scanning zone 105 near the mobile drive unit 120 or human worker. The scanning zone 105 may include an area around an entity within the workspace 170 as the entity performs a task. Some wireless scanning devices may be multi-mode wireless scanning devices. A multi-mode wireless scanning device may transmit and receive signals of varying frequencies to provide multiple scanning zones (e.g., 105*a*, 105*b*, and 105*c*) around an entity. For example, a wireless scanning device may include an RFID reader and a high-frequency RFID reader (HF-RFID).

The inventory system 100 may include a WI-FI/UWB-RTLS enabled RFID scanning device that can be worn on the hand, but does not interfere with grabbing, holding, and moving items or packages. The scanning of RFID tags may be triggered by pressure sensors of the reader device. For example, the reader device may include pressure sensors attached to one or more of the fingers of the device. In addition or alternatively, the real time location of the scanning device may be used to trigger scanning. For example, when the wireless scanning device is located with a scanning area, the scanning may be activated. If the device moves out of the scanning area, the scanning may be deactivated.

The wireless scanning device may include an UWB-RTLS tag that allows high accuracy detection of the position of the device. For example, when a human grabs a package, the pressure sensor may activate a wireless signal reader included in the wireless scanning device. The pressure sensor may continuously activate the wireless signal reader as long as the pressure sensor detects a load (e.g., the human is holding the package or item). The pressure sensor may active the wireless signal reader for a period of time. For example, the pressure sensor may activate the wireless signal reader for 5 seconds. The period of time may be a cyclical period of time (e.g., every 5 seconds) beginning when the pressure sensor detects the load and ending when the load is released. A cautionary alert may be issued on the reader device if no wireless identifier data was detected when the pressure sensors were triggered. For example, haptic feedback, audio feedback, or visual feedback may be presented by an output component included in the reader device.

The pressure sensor, passively activated switch, or gesture detector may also cause activation of the UWB-RTLS to obtain the location of the reader device. For example, activation may be initiated when the pressure sensor, passively activated switch, or gesture detector identify that an item is lifted based on one or more outputs. In some implementations, the time of the wireless identifier reads may be recorded and used by the inventory system to identify where the wireless scanning device was located using a log of positions of the reader device stored by the inventory system.

The position and wireless identifier data read may be transmitted via a network to an item tracking system. The item tracking system may look up information for the item or package based on the wireless identifier data. When a package or item is released, the wireless scanning device may activate another wireless identifier read. The position along with the additional wireless identifier read responses may be transmitted to the item tracking system. The release could also trigger a High Frequency RFID (HF-RFID) read to determine a container type in which the package was placed (e.g., bag versus pallet).

The item tracking system may use the item or package wireless identifier information to determine the location of a pallet or package where the item is supposed to be located based on information available to the item tracking system. Because the position of the pallet is known, the item tracking system may use the UWB-RTLS position when the item or package was released to determine whether it was placed on the correct pallet. If the package or item was placed in a bag, the HF-RFID tag information can be used to determine the bag into which the item or package was placed. The wireless identifier information detected when the item or package is released may include information read from items or packages already on the pallet. This information can be used to generate an additional verification that the item or package is on the correct pallet.

A package may be placed on the correct pallet if the item tracking system determines that the shipping information for the package corresponds to at least a portion of the shipping information for the pallet (e.g., matching city or state information). The correctness may include confirming restrictions for the pallet (e.g., do not include fragile items, do not include hazardous items, do not include items that have age or other use limitations). If a package including a fragile, hazardous, or restricted item is placed on a pallet with a corresponding restriction, the package may be identified as incorrectly placed. The restrictions may be obtained through messaging between a wireless scanning device and the management device 115 or a catalog system (not shown) including item handling information.

As an entity equipped with a wireless scanning device moves through the workspace 170, wireless identifiers that enter the scanning zone 105 may be detected. Detection may include transmitting a read message that is received by a wireless identifier and receiving a response message from the wireless identifier. Some of the wireless identifiers may be detected for a few moments while a wireless identifier included on an item carried by the entity would be detected during the time period the entity was carrying the item. Wireless identifiers detected within the scanning zone 105 may provide information. For example, an RFID tag may respond to an RFID read signal with an identifier. The identifier may be used as a look-up value to determine additional information about an item associated with the RFID tag. For example, an item identifier may be detected by a wireless scanning device. The item identifier may be used to query a catalog system for additional information about the item associated with the item identifier such as handling one or more instructions or destination locations (e.g., within the workspace 170 and/or shipping destination).

Wireless identifiers may be associated with inventory holders, entities, inventory stations, or other objects (e.g., processing equipment, dolly, door, physical structure) within the inventory system 100.

To conserve resources of the wireless scanning device, the wireless scanning device may selectively activate the scanning zone 105. For example, it may be desirable to scan during the period of time when an item is being moved from a first location to a second location. The scanning may be used to identify and confirm the location of an item being moved. As discussed above, the scanning may be activated in response to active or passive detection of an interaction with an item such as being lifted. The scanning may be deactivated once a second interaction with the item or inventory holder is detected such as the item or inventory holder being released.

A mobile drive unit may activate a wireless scanning device when initiating a lift command to move an item or inventory holder from a first location to a second location. The mobile drive unit may then deactivate the wireless scanning device once the item or inventory holder is dropped at the second location. A human worker may be carrying or wearing the wireless scanning device. In one implementation, the wireless scanning device may be included in or affixed to a wearable item such as a glove, a bracelet, or a hat.

Figure 2A:
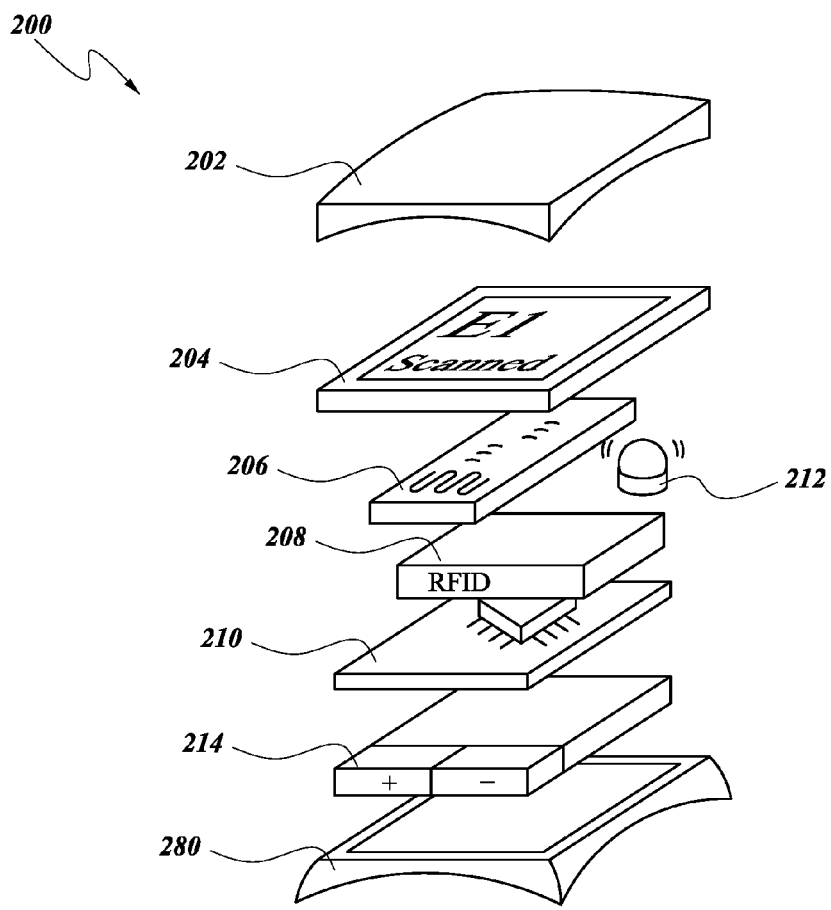
FIG. 2A is a pictorial diagram of an example wireless scanning device.

FIG. 2A is a pictorial diagram of an example wireless scanning device. The wireless scanning device 200 may include a top cover 202 and a bottom cover 280. When the top cover 202 joins with the bottom cover 280, an enclosed chamber may be formed. The enclosed chamber may include additional elements to allow the wireless scanning device 200 to read wireless identifiers. The top cover 202 may be formed of a shock resistant material to protect the elements of the wireless scanning device 200.

As shown in FIG. 2A, the wireless scanning device 200 may include a display 204. The display 204 may be implemented as a matrix display, light-emitting diode (LED) display, organic light-emitting diode (OLED) display, or other display component for presenting graphic information. The top cover 202 may be transparent or semi-transparent to allow viewing of information shown on the display 204.

The wireless scanning device 200 may include a wireless communication module 206. The wireless communication module 206 may include the hardware elements to allow the wireless scanning device 200 to transmit and receive wireless communications with other devices in the inventory system such as the management device 115 or item tracking system. The wireless communication module 206 may include one or more of a BLUETOOTH compatible transceiver, a WI-FI compatible transceiver, a mesh radio transceiver, cellular transceiver, or other wireless transceiver.

A wireless scanning module 208 may also be included in the wireless scanning device 200. The wireless scanning module 208 may include hardware elements to allow the wireless scanning device 200 to read wireless identifiers such as RFID tags or NFC data. The wireless scanning module 208 may include a RFID transceiver, NFC transceiver, or other wireless scanning transceiver. The wireless scanning module 208 may be dynamically tunable to allow the transceiver to send or receive specified frequencies. For example, the RFID transceiver may operate in a low frequency mode and a high frequency mode to scan different distances and/or types of RFID tags. In some implementations, separate low and high frequency transceivers may be included in the wireless scanning module. The wireless scanning module 208 may include one or more RFID readers such as those commercially available from ID-Innovations of Canningvale Australia (e.g., model nos. ID-3/12/20Up, ID-3/12/20LA-SA, ID-3/12/20LA-HE, ID-3/12/20LA-ISO, ID-3/12/20LA, ID-20-MF7, ID-3/12/20LA-LP, ID-0, ID-2, ID-10, ID-12, ID-20, or similar). As described in further detail below, such as with reference to FIG. 4, the frequency can be adjusted during item tracking to improve the accuracy of the item tracking.

The wireless scanning device 200 may include a microcontroller 210. The microcontroller 210 may coordinate the functions of the elements included in the wireless scanning device 200. For example, the microcontroller 210 may adjust the state of the wireless scanning module 208 (e.g., on/off, frequency, etc.). The microcontroller 210 may provide information for presentation via the display 204. For example, the microcontroller 210 may cause the display to present an output message upon activation of the wireless scanning module 208 or another element of the wireless scanning device 200. The message may indicate that the wireless scanning module 208 or other element of the wireless scanning device 200 has been activated. The message may include an identification of a wireless identifier successfully scanned. The microcontroller 210 may activate a location service (e.g., GPS or UWB-RTLS) to receive a current location for the wireless scanning device 200. The location information received may be used to activate/deactivate features of the wireless scanning device 200. For example, the type of wireless identifiers may be specific to a location or area within a workspace. Accordingly, the wireless scanning device 200 may determine its location and selectively control the wireless scanning module 208 to scan for wireless identifiers located in the same area as the wireless scanning device 200. The types and locations of wireless identifiers may be specified in memory, a wireless scanning configuration, or retrieved via messaging such as from a management device.

In some implementations, the microcontroller 210 may provide information to other output devices included in the wireless scanning device 200. For example, the wireless scanning device 200 may include a vibrating motor 212. The vibrating motor 212 may be driven by messages transmitted from the microcontroller 210 to provide haptic feedback. The message may indicate one or more of a speed or a duration for driving the vibrating motor 212. Using different speeds and/or durations, haptic feedback patterns may be generated to provide different feedback "messages." For example, a repetitive buzz may be associated with an error while a short, firm buzz may be associated with positive feedback. Other output devices that may be included in the wireless scanning device 200 and driven by the microcontroller 210 include audio output (e.g., sound or tone playback) or lighting elements (e.g., an LED that flashes different colors). The output device may include a heads-up display or other augmented reality device in communication with the microcontroller 210 and configured to present output based on messages received from the microcontroller 210.

Example implementations of the microcontroller 210 include the ARDUINO® boards commercially available from Arduino, LLC of Cambridge, Mass. Other examples of microcontrollers are offered by STMicroelectronics and Texas Instruments. The microcontroller 210 may include memory for storing instructions to coordinate the elements included in the wireless scanning device 200. The memory may also store information collected by the wireless scanning device 200 such as wireless identifiers read by the wireless scanning module 208. The wireless scanning device 200 may include alternate or additional memory in data communication with the microcontroller 210.

The wireless scanning device 200 may include a power source such as a battery 214. The battery 214 may be a rechargeable battery. In some implementations, the battery 214 is inductively charged or is charged using an external power source (not shown) such as via an electric wire or solar cell.

The elements included between the top cover 202 and the bottom cover 280 may be coupled by a bus (not shown). The bus may be a data bus, communication bus, power bus, or other bus mechanism to enable the various components of the wireless scanning device 200 to exchange resources (e.g., power) and/or information.

Figure 2B:
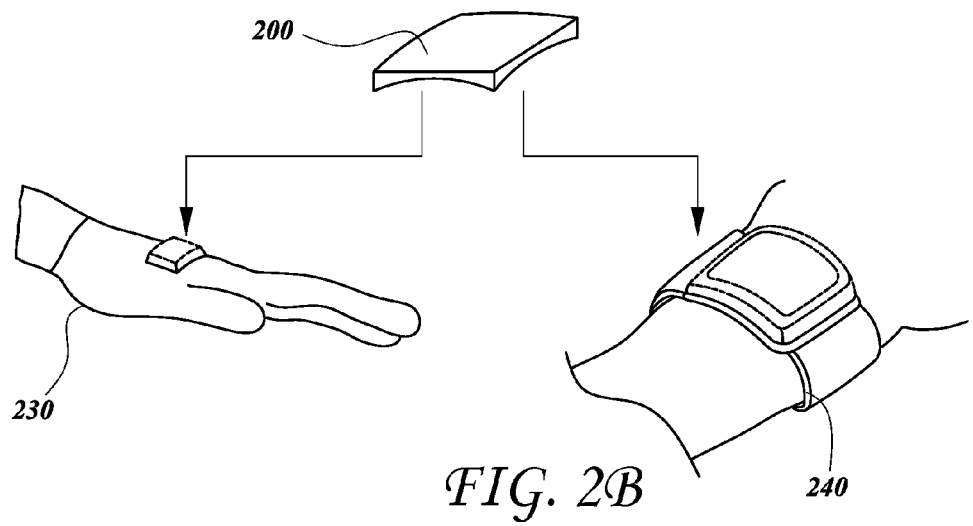
FIG. 2B is a pictorial diagram of example wearable items that may include the wireless scanning device of FIG. 2A.

FIG. 2B is a pictorial diagram of example wearable items that may include the wireless scanning device of FIG. 2A. FIG. 2B shows examples of the wireless scanning device 200 as mounted to a glove 230 and a bracelet 240. It will be understood that the wireless scanning device 200 can be integrated with other wearable items such as a hat, shirt, pants, or belt, to name a few. The wireless scanning device 200 may be integrated with another computing device such as a tablet computer, laptop computer, smartphone, scanner, or other equipment used in the inventory system. The wireless scanning device 200 may be included in non-human equipment such as a mobile drive unit. In such implementations, some feedback elements such as a display may be omitted.

The mounting of the wireless scanning device 200 on the glove 230 or the bracelet 240 may be a physical mounting. In such implementations, the wireless scanning device 200 is physically coupled with the wearable item. The physical coupling may include VELCRO® attachment, a snap-in/snap-out attachment, an adhesive attachment, or other similar structural coupling. In some implementations, the wireless scanning device 200 may include conductive coupling with the wearable item. For example, if the fingertips of the glove 250 include passive switch terminals that are activated when the tips are brought together, the passive switch may be coupled with the wireless scanning device 200 to allow the wireless scanning device 200 to receive information from the switch. Another example conductive coupling may be with an antenna included in the glove 230 or the bracelet 240. Including an antenna in the wearable item that can be coupled with the wireless scanning device 200 can increase the ability of the wireless scanning device 200 to transmit and receive wireless signals. This may also allow individual users to use their own equipment such as a set of gloves or wristbands.

Whether associated with a human or a robotic entity, as the wireless scanning device 200 moves through the workspace 170, the wireless scanning device 200 may activate the wireless scanning module 208 to detect wireless identifiers. The wireless scanning module 208 may identify a frequency to emit, transmit one or more signals of the identified frequency, and receive a response signal. The response signals may include information such as an item identifier or unique identifier for the wireless identifier that can be used to look up an item identifier such as from an item tracking system. Characteristics of the response signals may also be used to analyze the response signals. For example, the strength of the response signal may be used to generate a received signal strength indicator value for the response signal. The phase of the response signal may be another characteristic used for analysis. The response signals and/or characteristics of the response signals may be stored in memory, such as a memory coupled with the wireless scanning module 208 and/or the microcontroller 210. The stored information may be analyzed to accurately identify the location of items associated with the detected wireless indicators.

FIG. 3A is a pictorial diagram showing a top view of an example glove that may include pressure sensors and the wireless scanning device of FIG. 2A. The glove 300 is shown in FIG. 3A as if looking at the top of the glove 300 when worn by a hand with its palm facing away. The glove 300 includes a finger 302. Near the tip of the finger 302, a first portion of a pressure sensor 304a and a second portion of the pressure sensor 304b are shown. The first portion 304a may be connected to a first conductive lead 306a that transmits electrical signals from the first portion 304a to the wireless scanning device 200. The second portion 304b may be connected to a second conductive lead 306b that transmits electrical signals from the second portion to the wireless scanning device 200. A conductive lead may be formed from soft wires, conductive fabric, conductive thread, and/or conductive paint. The leads may be insulated and affixed to the surface of the glove 300. In some implementations, it may be desirable to embed the leads below the surface of the glove 300.

A first conductive antenna lead 308a and a second conductive antenna lead 308b may also be included in the glove 300. The conductive antenna leads may connect the wireless scanning device 200 with an antenna such as shown in FIG. 3B. This allows the wireless scanning device 200 to transmit and receive messages via an antenna included in the glove 300. A conductive antenna lead may be formed from soft wires, conductive fabric, conductive thread, and/or conductive paint. The leads may be insulated and affixed to the surface of the glove 300. In some implementations, it may be desirable to embed the leads below the surface of the glove 300.

In implementations where the wireless scanning device 200 is detachably mounted with the glove 300, the conductive leads may terminate at conductive mount points on the glove 300 (not shown) to connect through the bottom cover 280 of the wireless scanning device 200. This creates a communications path between the sensors (e.g., pressure sensor 304a, pressure sensor 304b) and the wireless scanning device 200. The wireless scanning device 200 may be detached from the glove 300 for recharging of the battery 214 and/or repair. One or more wireless scanning devices may be charged at a docking station where each device rests is a cradle to recharge the battery. An indication of the battery charging status may be provided by each docking station (e.g., LED light) and/or via the display of the wireless scanning device.

FIG. 3B is a pictorial diagram showing a bottom view of the example glove of FIG. 3A. The pressure sensor 304 can be seen on the glove 300 near the tip of the finger 302. In this configuration, as a hand wearing the glove 300 grasps an item, the force exerted on the pressure sensor 304 by the item can be measured. This force can be used to determine whether an item is being held such as by comparing the measured value with a lifting force threshold. The lifting force threshold may be provided in a wireless scanning configuration accessible by the wireless scanning device 200. In some implementations, the pressure sensor 304 may be implemented as a pressure switch configured to emit a signal when the detected pressure exceeds a threshold.

The glove 300 may include a fabric portion 312 and an antenna 314. As with the conductive leads shown in FIG. 3A, the antenna 314 may be may be formed of soft wires. The antenna may be insulated and affixed to the surface of the glove 300. In some implementations, it may be desirable to embed the antenna below the surface of the glove 300. Placing the antenna 314 on the palm of the glove 300 may provide a more sensitive wireless scanning field for items held by or near the glove 300. The antenna 314 may be electronically coupled with the wireless scanning device 200. The first conductive antenna lead 308a and the second conductive antenna lead 308b are shown in FIG. 3B. The conductive antenna leads may couple the antenna 314 with the wireless scanning device 200. A wireless scanning module and/or wireless communication module may be configured to transmit and/or receive signals via the antenna 314.

As shown in FIG. 3A, three fingers of the glove 300 include pressure sensors. Fewer or additional fingers may include pressure sensors in other embodiments. In some implementations, a force measurement from one pressure sensor may be sufficient to activate the wireless scanning (e.g., any force sensed that is greater than a threshold). In some implementations, the force measurement from multiple pressure sensors may be needed to activate wireless scanning (e.g., a force greater than a threshold is detected for at least two sensors).

The detection of lifting using pressure sensors may be calibrated prior to lifting an item. For example, when a human puts the glove 300 on and turns on the wireless scanning device 200, the wireless scanning device 200 may display a message indicating that the human should pick up an item of a specified weight. Once the human grasps the item, another message may be displayed indicating the item can be released. Using the detected force values from the available force sensors, a lifting threshold may be determined for the human. For example, the human may favor using their thumb and middle finger when lifting an item. Accordingly, the threshold for detecting lifting may require a higher threshold for the thumb and middle finger than the pointer finger of the human.

In some implementations, calibration information may be provided to the wireless scanning device 200. For example, the wireless scanning device 200 may include a wireless scanning module that can detect a security badge that identifies the human. Using the identity of the human, calibration information can be obtained from a local data storage on the wireless scanning device 200 or via network communication with a remote data storage. The calibration information may then be used to passively detect actions of the wearer such as an interaction with the item (e.g., lifting). For example, the calibration information may include a current through a contact switch formed between fingers of a user when lifting. As each user may position their fingers differently during lifting, the calibration information can be used to adjust the level at which an interaction is detected for individual users.

FIG. 4A is a pictorial diagram showing a top view of another example glove that may include a contact switch lifting sensor and the wireless scanning device of FIG. 2A. Whereas FIG. 3A used a force sensor as the passive activation switch, FIG. 4A shows how a contact switch may be used to sense lifting of an item. A glove 400 may include a contact switch. The contact switch may be formed using a positive contact 408 and a negative contact 410 on adjacent fingers, finger 404 and finger 406, respectively. The positive contact 408 and the negative contact 410 may be formed of a conductive fabric.

The positive contact 408 may be conductively coupled to the wireless scanning device 200 using a conductive lead 412. The negative contact 410 may be conductively coupled to the wireless scanning device 200 using a conductive lead 414. A conductive lead may be formed of soft wires. The wires may be insulated and affixed to the surface of the glove 400. In some implementations, it may be desirable to embed the wires below the surface of the glove 400. A conductive lead may be formed from soft wires, conductive fabric, conductive thread, and/or conductive paint.

As shown in FIG. 4A, the contact switch is in the open position. While in the open position, the wireless scanning device 200 may detect that no current is flowing through a circuit formed with the contact switch or a current below a threshold is flowing through the circuit formed with the contact switch. In some implementations, the wireless scanning module 208 may receive power only when the circuit is closed. This configuration may be desirable to avoid requiring the microcontroller 210 to monitor the circuit and allowing the contact switch to passively control the wireless scanning module 208 as a worker shapes their hand to lift an item without expressing a separate, specific intent to scan (e.g., pointing and pressing a button to activate a scanner).

The glove 400 may include a first conductive antenna lead 416a and a second conductive antenna lead 416b. The conductive antenna leads may connect the wireless scanning device 200 with an antenna such as shown in FIG. 4B. This allows the wireless scanning device 200 to transmit and receive messages via an antenna included in the glove 400. A conductive antenna lead may be formed from soft wires, conductive fabric, conductive thread, and/or conductive paint. The leads may be insulated and affixed to the surface of the glove 400. In some implementations, it may be desirable to embed the leads below the surface of the glove 400.

FIG. 4B is a pictorial diagram showing a bottom view of the example glove of FIG. 4A. As in FIG. 4A, the contact switch in FIG. 4B is in the open position. The finger 404 and finger 406 are in a similar position as shown in FIG. 4A. The space between the positive contact 408 and the negative contact 410 provides little or no current flowing through the circuit formed with the contact switch.

The glove 400 may include a fabric portion 422 and an antenna 420. The antenna 420 may be may be formed using conductive fabric, conductive thread, and/or conductive paint. The antenna 420 may be insulated and affixed to the surface of the glove 400. In some implementations, it may be desirable to embed the antenna 420 below the surface of the glove 300. Placing the antenna 420 on the palm of the glove 400 may provide a more sensitive wireless scanning field for items held by or near the glove 400. The antenna 420 may be electronically coupled with the wireless scanning device 200. The first conductive antenna lead 416a and the second conductive antenna lead 416b are shown in FIG. 4B. The conductive antenna leads may couple the antenna 420 with the wireless scanning device 200. A wireless scanning module and/or wireless communication module included in the wireless scanning device 200 may be configured to transmit and/or receive signals via the antenna 420.

FIG. 4C is a pictorial diagram of the example glove of FIG. 4A with the contact switch activated. Unlike FIGS. 4A and 4B, the contact switch in FIG. 4C is in the closed position. The finger 404 and finger 406 are now touching. There is no space between the positive contact 408 and the negative contact 410. The coupling of the positive contact 408 and the negative contact 410 closes the circuit and causes current to flow. This current may be provided to the wireless scanning device 200 via the conductive leads shown in FIG. 4A. The current may drive the wireless scanning module 208 directly or cause the microcontroller 210 to activate the wireless scanning module 208.

The glove 400 shown in FIGS. 4A, 4B, and 4C is a three finger glove. More or fewer fingers may be included in the glove 400. In some implementations, the glove 400 may be an over glove designed to fit over a worker's gloved hand. This allows the worker to use a work glove of their choice and then don a passive sensing device, such as the glove 400, over the work glove.

The detection of lifting using contact circuits may be calibrated prior to lifting an item. For example, when a human puts on the glove 400 and turns on the wireless scanning device 200, the wireless scanning device 200 may display a message indicating that the human should pick up an item. Once the human grasps the item, another message may be displayed indicating that the item can be released. Using the currents detected before, during, and after lifting, a lifting threshold may be determined for the human. For example, degree to which the human brings the fingers having the contacts may be manifested in the current difference between resting and lifting. Accordingly, the threshold for detecting lifting may require a lower threshold for a human that lifts with spread fingers than another human that lifts with fingers in a closer position.

In some implementations, the calibration information may be provided to the wireless scanning device 200. For example, the wireless scanning device 200 may include a wireless scanning module that can detect a security badge that identifies the human. Using the identity of the human, calibration information can be obtained from a local data storage on the wireless scanning device 200 or via network communication with a remote data storage.

Figure 5:
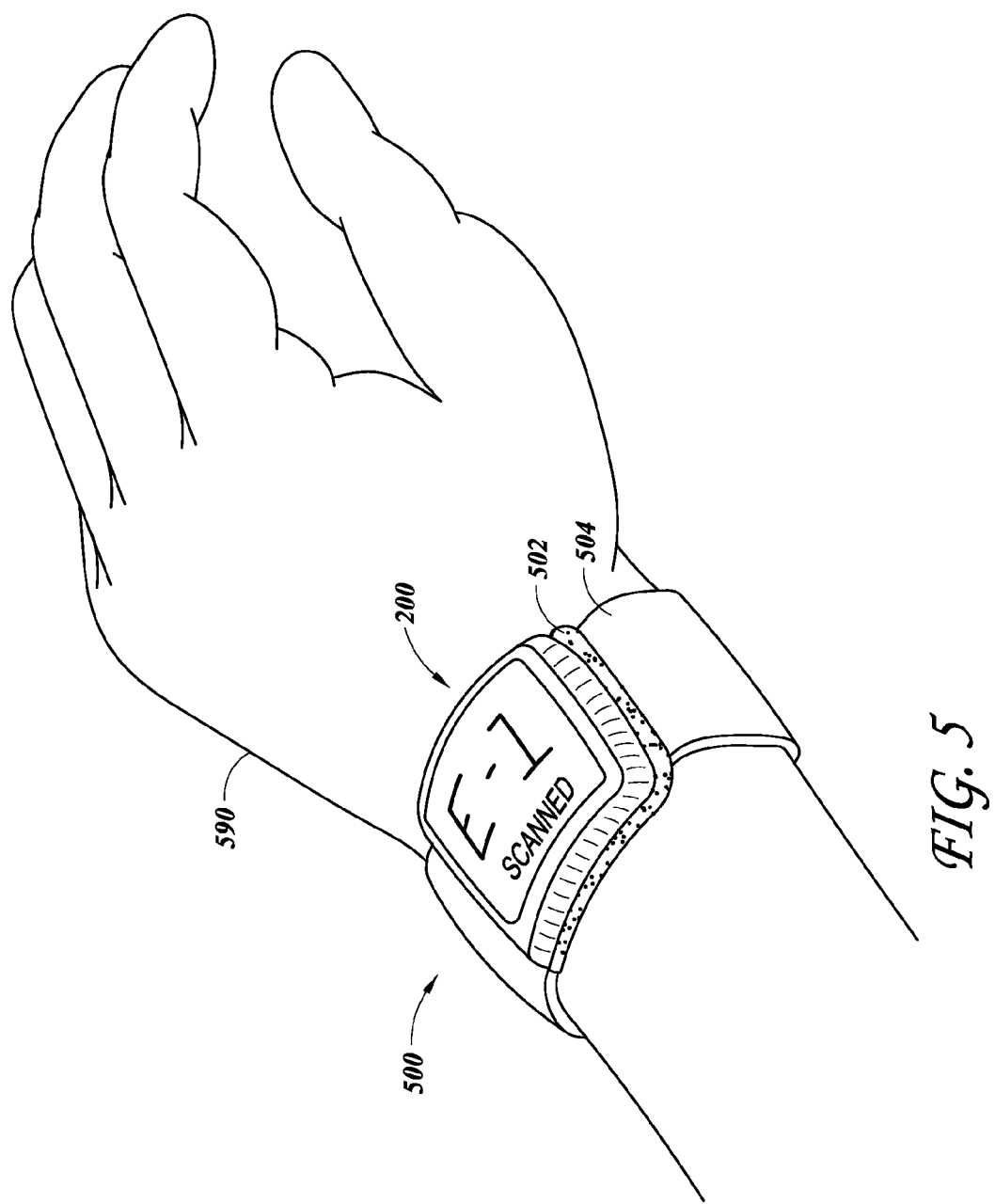
FIG. 5 is a pictorial diagram of an example bracelet that may include the wireless scanning device of FIG. 2A.

FIG. 5 is a pictorial diagram of an example bracelet that may include the wireless scanning device of FIG. 2A. A bracelet 500 may be adapted for wearing on a wrist near a hand 590 of the human worker. The bracelet 500 may include a mounting structure configured to detachably mount the wireless scanning device 200. The mounting structure may be a snap in mounting structure, a tension mount, an adhesive mount, a hook and loop fastener mount, a threaded mount, or similar structure to secure the wireless scanning device to the bracelet 500 yet allow for the wireless scanning device 500 to be detached from the bracelet 500.

The bracelet 500 may include a band 504. The band 504 may be formed of fabric, rubber or other durable material. The band 504 may be used to secure the bracelet 500 to the wrist.

FIG. 6 is a pictorial diagram of an example bracelet that may include an antenna and the wireless scanning device of FIG. 2A. The bracelet 600 shown in FIG. 6 may include a first antenna 602 and a second antenna 604. The first antenna 602 and the second antenna 604 may be conductively coupled with the wireless scanning device 200. The wireless scanning device 200 may be detachably coupled with the bracelet 600.

When coupled with the bracelet 600, the wireless scanning device 200 may use the first antenna 602 and/or the second antenna 604 for transmitting and/or receiving wireless signals. The first antenna 602 and/or the second antenna 604 may be insulated and affixed to the band of the bracelet 600. In some implementations, it may be desirable to embed the antenna below the surface of the band of the bracelet 600. The first antenna 602 and/or the second antenna 604 may be formed of a conductive material such as conductive fabric, conductive thread, conductive paint, or wiring. The length of the first antenna 602 and/or the second antenna 604 may be selected based on the desired wavelengths of transmissions to or from the wireless scanning device 200.

The bracelet 600 may include a clasping surface 630. The clasping surface 630 may be used to secure the bracelet 600 to a wrist by clasping with a clasping loop 610. For example, the clasping surface 630 may be a VELCRO strap and the clasping loop 610 may be a VELCRO strap loop. The clasping surface may be formed of a material that does not cause interference with the wireless signals sent or received by the first antenna 602 or the second antenna 604. The clasping surface may also be formed of a material that does not cause interference with the wireless scanning device 200.

To passively detect lifting, some bracelet implementations may feature a wireless scanning device that includes an accelerometer. The accelerometer may generate a motion input indicating a gesture or other hand movement. The motion input may be compared with a predetermined activation gesture. For example, the worker may double tap an item just before picking up the item. The accelerometer may detect the double tap and identify this action as an activation gesture. The activation gesture may be defined in a wireless scanning configuration or as a personal setting for the human using the bracelet. For example, when a human turns on the bracelet, a message may be displayed on the wireless scanning device asking the human to execute the desired activation gesture. This allows each human to define their own custom activation gesture that may be unique to the way he or she grabs and/or carries items.

FIG. 7 is a pictorial diagram of another example bracelet that may include an antenna and the wireless scanning device of FIG. 2A. The bracelet 700 may include the wireless scanning device 200. The bracelet 700 in FIG. 7 includes one antenna 704 rather than two antennas as shown in FIG. 6. The antenna 704 may be insulated and affixed to the band of the bracelet 700. In some implementations, it may be desirable to embed the antenna 704 below the surface of the band of the bracelet 700. The antenna 704 may be formed of a conductive material such as conductive fabric, conductive thread, conductive paint, or wiring.

Figure 8A:
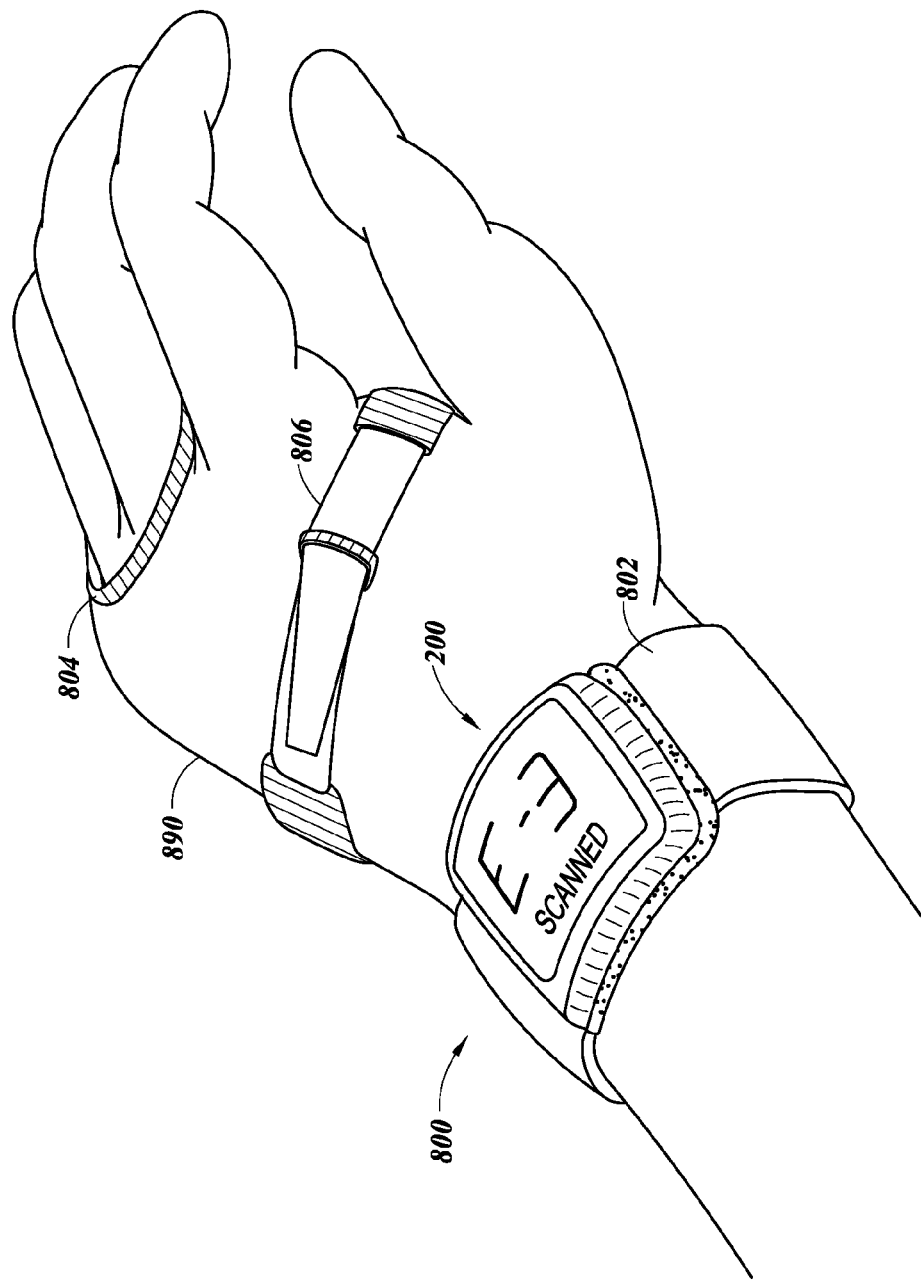
FIG. 8A is a pictorial diagram of a top view of an example bracelet with a holding loop that may include the wireless scanning device of FIG. 2A.
Figure 8B:
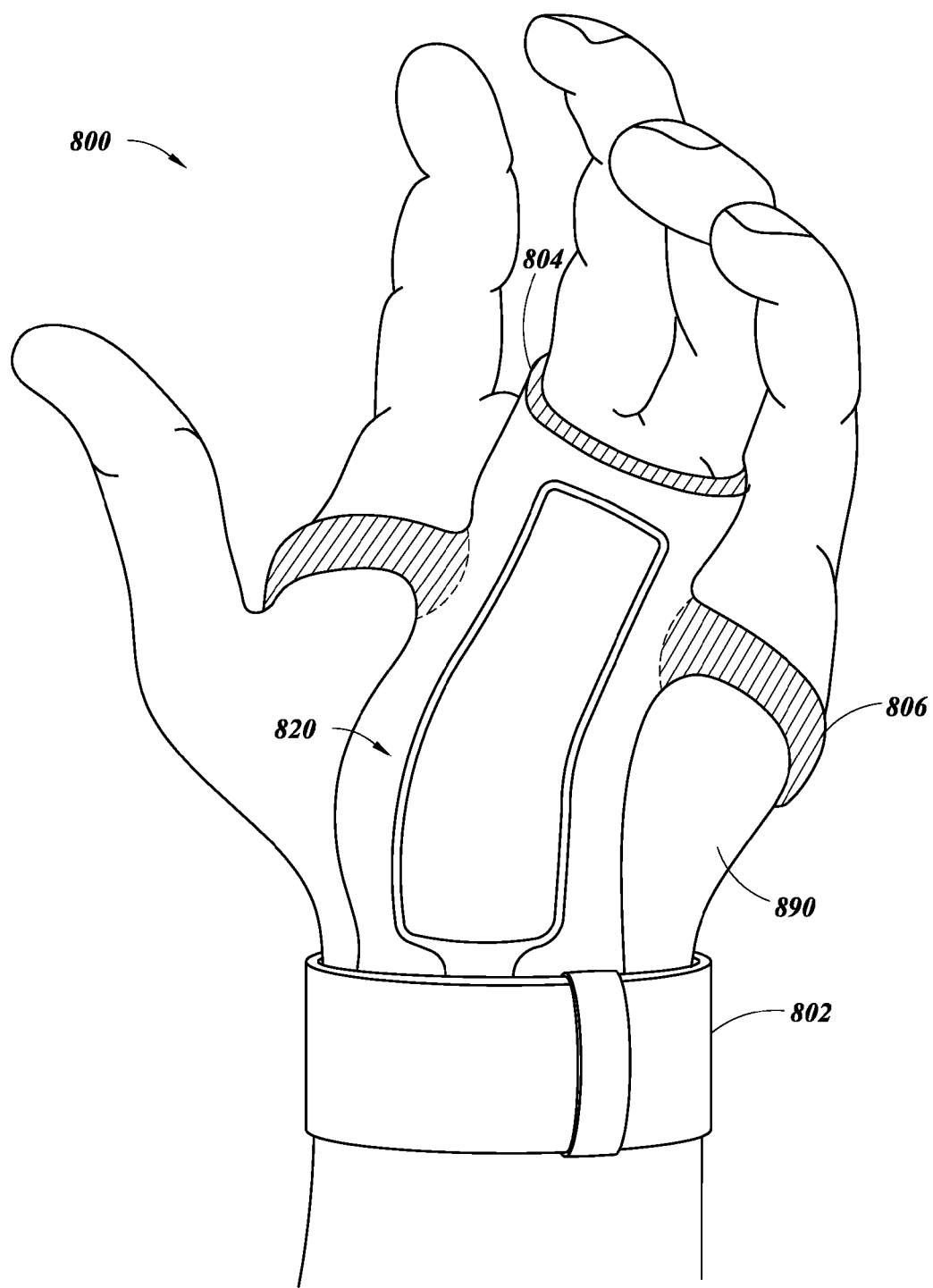
FIG. 8B is a pictorial diagram of a bottom view of the example bracelet shown in FIG. 8A including an antenna.

FIG. 8A is a pictorial diagram showing a top view of an example bracelet with a holding loop that may include the wireless scanning device of FIG. 2A. Rather than embed an antenna in the band of the bracelet, the embodiment shown in FIGS. 8A and 8B illustrate the use of an antenna in the palm that is attached to a hand 890 using a holding strap 806 and a holding loop 804. The implementation shown in FIGS. 8A and 8B may be used as a stand-alone wearable wireless scanning devices, in conjunction with contact switch gloves (e.g., the glove 400 shown in FIG. 4A), or over a work glove. The holding loop 804 may be formed of a flexible fabric, silicon rubber or other durable material to secure the palm antenna against the hand 890. The holding loop 804 may slip on over one or more of the fingers of the hand 890. The holding strap 806 may be an adjustable strap that also secures the antenna to the palm of the hand. The bracelet 800 may also include a band 802 to secure the bracelet 800 to the wrist.

FIG. 8B is a pictorial diagram showing a bottom view of the example bracelet shown in FIG. 8A including an antenna. The bottom view shown in FIG. 8B is taken from the perspective of the palm of the hand 890. The holding strap 806 and the holding loop 804 secure an antenna 820 to the palm. The antenna 820 may be embedded in thin, durable, soft, non-slip, silicon rubber. The antenna 820 may be conductively coupled with the wireless scanning device 200. The antenna 820 may couple with the wireless scanning device 200 via conductive elements included in the band 802. In some implementations, the bracelet 800 may include additional antenna elements such as shown in FIGS. 6 and/or 7.

Figure 9:
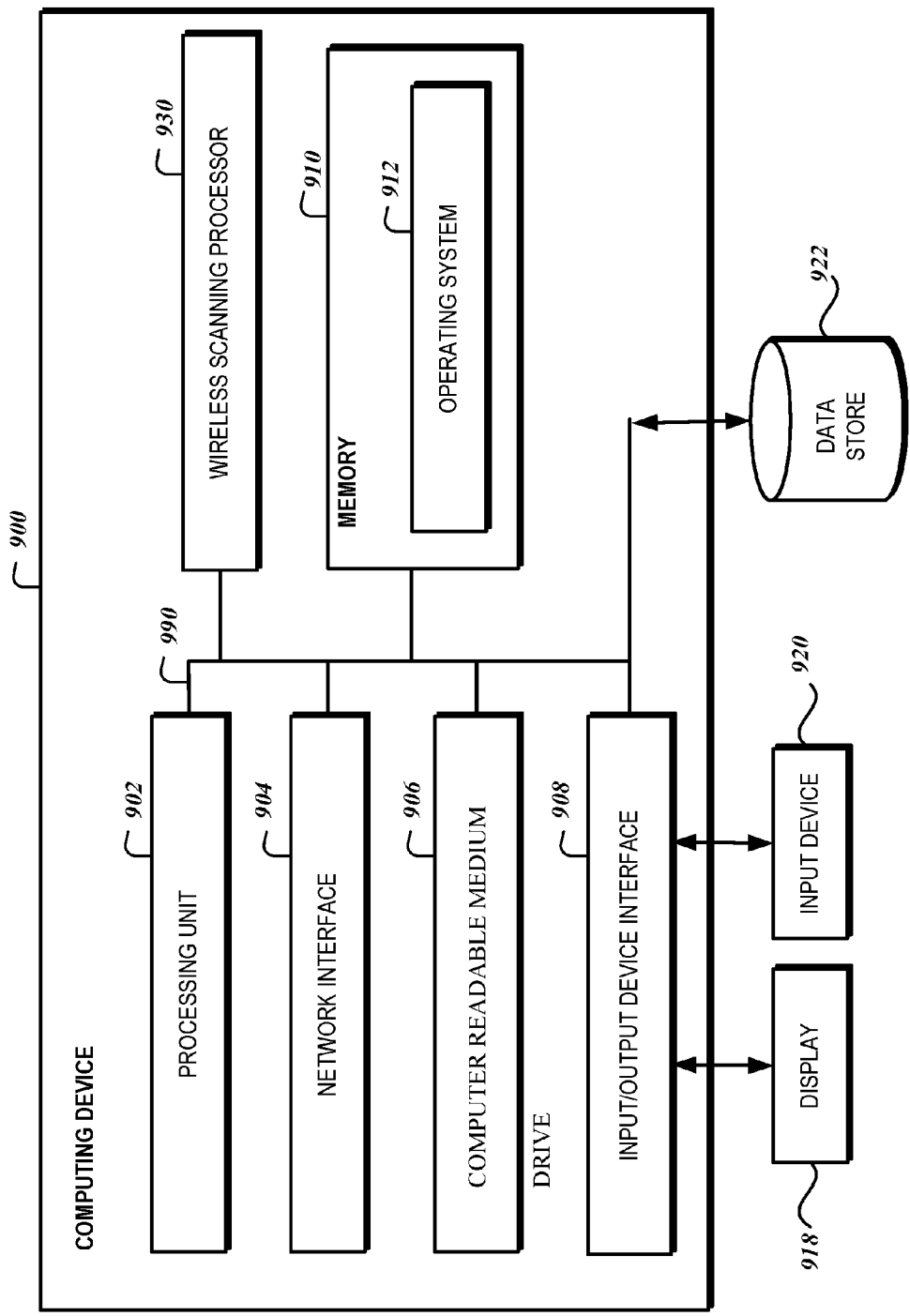
FIG. 9 is a functional block diagram of an example computing device for wireless scanning.

FIG. 9 is a functional block diagram of an example computing device for wireless scanning. The computing device 900 may be configured to execute some or all of the processes and embodiments described herein. For example, computing device 900 may be implemented by any device having a processor, including a telecommunication device, a cellular or satellite radio telephone, a laptop, tablet, or desktop computer, a digital television, a personal digital assistant (PDA), or by a combination of several such devices, including any in combination with a network-accessible server. The computing device 900 may be implemented in hardware and software using techniques known to persons of skill in the art. The disclosed features for wireless scanning may alternatively be distributed across a system of two or more distinct computing devices.

The computing device 900 can include a processing unit 902, a network interface 904, a computer readable medium drive 906, an input/output device interface 908 and a memory 910. The network interface 904 can provide connectivity to one or more networks or computing systems. The processing unit 902 can receive information and instructions from other computing systems or services via the network interface 904. The network interface 904 can also store data directly to memory 910. The processing unit 902 can communicate to and from memory 910. The input/output device interface 908 can accept input from the optional input device 920, such as a keyboard, mouse, digital pen, microphone, camera, etc. In some embodiments, the optional input device 920 may be incorporated into the computing device 900. Additionally, the input/output device interface 908 may include other components including various drivers, amplifiers, preamplifiers, front-end processors for speech, analog to digital converters, digital to analog converters, etc.

The memory 910 may contain computer program instructions that the processing unit 902 executes in order to implement one or more embodiments. The memory 910 generally includes RAM, ROM and/or other persistent, non-transitory computer-readable media. The memory 910 can store an operating system 912 that provides computer program instructions for use by the processing unit 902 in the general administration and operation of the computing device 900. The memory 910 can further include computer program instructions and other information for implementing some or all of the features described. For example, in one embodiment, the memory 910 includes A wireless scanning processor 930 may be included in the computing device 900 to coordinate the scanning activities described. The wireless scanning processor 930 may include a wireless scanning configuration that provides configuration values to adjust the state of the computing device 900 to perform wireless scanning. For example, the wireless scanning configuration may identify how often to read wireless identifiers, frequencies to use for reading wireless identifiers, thresholds for detecting lifting/dropping of an item, locations where scanning should be activated/deactivated, frequencies for scanning particular locations, and other information to support the wireless scanning. In some implementations, the wireless scanning configuration may be stored in the memory 910, firmware of the computing device 900, or other location accessible by the wireless scanning process 930.

The memory 910 may also include or communicate with one or more auxiliary data stores, such as a data store 922.

The data store 922 may electronically store data collected during wireless scanning such as wireless identifiers, wireless identifier read responses, wireless identifier read response signal characteristics, and the like. A bus 990 may be included in the computing device 900 to allow the elements included in the computing device 900 to exchange data (e.g., messages).

In some embodiments, the computing device 900 may include additional or fewer components than are shown in FIG. 9. For example, a computing device 900 may include more than one processing unit 902 and computer readable medium drive 906. In another example, the computing device 900 may not include or be coupled to an input device 920, include a network interface 904, include a computer readable medium drive 906, include an operating system 912, or include or be coupled to a data store 922. In some embodiments, two or more computing devices 900 may together form a computer system for executing features of the present disclosure.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations, or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, or as a combination of electronic hardware and executable software. To clearly illustrate this interchangeability, various illustrative components, blocks, modules, and steps have been described above generally in terms of their functionality. Whether such functionality is implemented as hardware, or as software that runs on hardware, depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a mobile drive unit, management device, or other hardware included in an inventory system. The mobile drive unit, management device, or other hardware included in an inventory system may include a digital signal processor (DSP), an application specific integrated circuit (ASIC), a field programmable gate array (FPGA), a microprocessor, a controller, microcontroller, or other programmable logic element, discrete gate or transistor logic, discrete hardware components, or any combination thereof. Devices used to implement the inventory system are specially designed to perform the wireless scanning features described herein. One or more of the devices included in the inventory system may include electrical circuitry configured to process specific computer-executable to perform one or more of the features described herein. In embodiments where a device includes a FPGA or similar programmable elements, the inventory system (or a device included therein) may provide one or more of the features described processing without processing computer-executable instructions but instead by configuring the FPGA or similar programmable element to perform the recited features. Although described herein primarily with respect to digital technology, aspects of the inventory system may also include primarily analog components. For example, some or all of the wireless scanning features described herein may be implemented in analog circuitry or mixed analog and digital circuitry.

The elements of a method, process, routine, or algorithm described in connection with the embodiments disclosed herein can be embodied directly in wireless scanning hardware, in a software module executed by one or more devices included in the wireless scanning device, or in a combination of the two. A software module can reside in RAM memory, flash memory, ROM memory, EPROM memory, EEPROM memory, registers, hard disk, a removable disk, a CD-ROM, or similar form of a non-transitory computer-readable storage medium. An illustrative storage medium can be coupled to the inventory system such that the inventory system (or a device included therein) can read information from, and write information to, the storage medium. In the alternative, the storage medium can be integral to the wireless scanning system or device having a need therefor.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

As used herein, the terms "determine" or "determining" encompass a wide variety of actions. For example, "determining" may include calculating, computing, processing, deriving, generating, obtaining, looking up (e.g., looking up in a table, a database or another data structure), ascertaining and the like via a hardware element without user intervention. Also, "determining" may include receiving (e.g., receiving information), accessing (e.g., accessing data in a memory) and the like via a hardware element without user intervention. Also, "determining" may include resolving, selecting, choosing, establishing, and the like via a hardware element without user intervention.

As used herein, the terms "provide" or "providing" encompass a wide variety of actions. For example, "providing" may include storing a value in a location of a storage device for subsequent retrieval, transmitting a value directly to the recipient via at least one wired or wireless communication medium, transmitting or storing a reference to a value, and the like. "Providing" may also include encoding, decoding, encrypting, decrypting, validating, verifying, and the like via a hardware element.

As used herein, the term "message" encompasses a wide variety of formats for communicating (e.g., transmitting or receiving) information. A message may include a machine readable aggregation of information such as an XML document, fixed field message, comma separated message, or the like. A message may, in some implementations, include a signal utilized to transmit one or more representations of the information. While recited in the singular, it will be understood that a message may be composed, transmitted, stored, received, etc. in multiple parts.

As used herein "receive" or "receiving" may include specific algorithms for obtaining information. For example, receiving may include transmitting a request message for the information. The request message may be transmitted via a network as described above. The request message may be transmitted according to one or more well-defined, machine readable standards which are known in the art. The request message may be stateful in which case the requesting device and the device to which the request was transmitted maintain a state between requests. The request message may be a stateless request in which case the state information for the request is contained within the messages exchanged between the requesting device and the device serving the request. One example of such state information includes a unique token that can be generated by either the requesting or serving device and included in messages exchanged. For example, the response message may include the state information to indicate what request message caused the serving device to transmit the response message.

As used herein "generate" or "generating" may include specific algorithms for creating information based on or using other input information. Generating may include retrieving the input information such as from memory or as provided input parameters to the hardware performing the generating. Once obtained, the generating may include combining the input information. The combination may be performed through specific circuitry configured to provide an output indicating the result of the generating. The combination may be dynamically performed such as through dynamic selection of execution paths based on, for example, the input information, device operational characteristics (e.g., hardware resources available, power level, power source, memory levels, network connectivity, bandwidth, and the like). Generating may also include storing the generated information in a memory location. The memory location may be identified as part of the request message that initiates the generating. In some implementations, the generating may return location information identifying where the generated information can be accessed. The location information may include a memory location, network locate, file system location, or the like.

As used herein, "activate" or "activating" may refer to causing or triggering a mechanical, electronic, or electromechanical state change to a device. Activation of a device may cause the device, or a feature associated therewith, to change from a first state to a second state. In some implementations, activation may include changing a characteristic from a first state to a second state such as, for example, enabling or disabling a component of the wireless scanning device or changing an operational characteristic of a component such as the frequency emitted by the wireless scanning device. Activating may include generating a control message indicating the desired state change and providing the control message to the device to cause the device to change state.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

The invention claimed is:

1. A wireless scanning device comprising:
a glove to be worn on at least a portion of a hand;
a pressure sensor attached to a first surface of the glove, the pressure sensor configured to detect a force exerted by an item held by the hand wearing the glove;
a wireless scanner affixed to the glove; and
a microcontroller affixed to the glove, and conductively coupled with (i) the pressure sensor, and (ii) the wireless scanner, the microcontroller configured to:
determine the force exceeds a lifting force threshold, wherein the lifting force threshold identifies a minimum force that indicates that an item has been lifted, and
activate the wireless scanner to detect wireless identifiers.

2. The wireless scanning device of claim 1, further comprising:
a display affixed to a second surface of the glove,
wherein the microcontroller is in data communication with the display, and
wherein the microcontroller is further configured to:
cause presentation of an output message via the display upon activation of the wireless scanner, the output message indicating that wireless identifiers are being scanned.

3. The wireless scanning device of claim 1, further comprising:
an antenna affixed to at least a portion of the glove and in electronic communication with the wireless scanner,
wherein the wireless scanner transmits wireless identifier read messages via the antenna, and
wherein the wireless scanner receives wireless identifier response messages via the antenna.

4. The wireless scanning device of claim 1, wherein the microcontroller is further configured to:
determine the force is less than the lifting force threshold; and
deactivate the wireless scanner to cease detecting wireless identifiers.

5. A wireless scanning device comprising:
a passively activated switch configured to activate in response to detecting a first interaction with an item, wherein the interaction occurs within a scanning area;
a wireless scanner configured to:
transmit a request message for detecting a wireless identifier, and
receive a response message from the wireless identifier; and
a microcontroller conductively coupled with (i) the passively activated switch, and (ii) the wireless scanner,
wherein the microcontroller is configured to, in response to the passively activated switch being activated, activate the wireless scanner to transmit the request message for detecting the wireless identifier and receive the response message from the wireless identifier.

6. The wireless scanning device of claim 5, further comprising a display in data communication with the microcontroller,
wherein the microcontroller is further configured to cause presentation of an output message via the display in response to activating the wireless scanner, the output message indicating that wireless scanner has been activated.

7. The wireless scanning device of claim 5, further comprising a vibrating motor in data communication with the microcontroller,
wherein the microcontroller is further configured to drive the vibrating motor at a first speed for a first period of time in response to activating the wireless scanner, the first speed and the first period of time associated with haptic feedback indicating that wireless scanner has been activated.

8. The wireless scanning device of claim 5, further comprising a wearable item,
wherein the microcontroller and the wireless scanner are enclosed in a housing, and
wherein the housing is detachably mounted on a surface of the wearable item.

9. The wireless scanning device of claim 8, further comprising an antenna included in at least a portion of the wearable item and in electronic communication with the wireless scanner,
wherein the wireless scanner transmits the read message for detecting the wireless identifier via the antenna, and
wherein the wireless scanner receives the response message from the wireless identifier via the antenna.

10. The wireless scanning device of claim 8, wherein the wearable item comprises a bracelet.

11. The wireless scanning device of claim 5,
wherein the passively activated switch is further configured to deactivate upon in response to detecting a second interaction with the item, and
wherein the microcontroller is configured to, in response to the passively activated switch detecting the second interaction with the item, deactivate the wireless scanner.

12. The wireless scanning device of claim 5,
wherein the first interaction with the item comprises lifting of the item,
wherein the passively activated switch comprises a force sensor, and
wherein the first interaction with the item is detected based at least in part on a comparison of a lifting threshold and a force value generated by the force sensor.

13. The wireless scanning device of claim 5, wherein the passively activated switch is further configured to deactivate in response to determining that a location of the wireless scanner is outside the scanning area.

14. The wireless scanning device of claim 5,
wherein the first interaction with the item comprises lifting of the item,
wherein the passively activated switch comprises an electrical circuit including a first contact and a second contact,
wherein the first contact and second contact close the electrical circuit when the item is lifted, and
wherein the first interaction with the item is detected from sensing a current through the electrical circuit closed by the first contact and the second contact.

15. A system comprising:
a data store storing specific computer-executable instructions; and
a first computing device in communication with the data store, the computing device including a processor that executes the specific computer-executable instructions to cause the system to at least:
receive a first value from a passively activated switch, the first value indicating that an item is moved;
determine a location of the passively activated switch; and
based at least in part on at least one of the location and the first value, activate a wireless scanner to: (i) transmit a request message for detecting a wireless identifier, and (ii) receive a response message from the wireless identifier.

16. The system of claim 15, wherein the specific computer-executable instructions further cause the system to at least cause presentation of an output message via a display in response to activating the wireless scanner, the output message indicating that the wireless scanner has been activated.

17. The system of claim 15, wherein the specific computer-executable instructions further cause the system to at least drive a vibrating motor at a first speed for a first period of time in response to activating of the wireless scanner, the first speed and the first period of time associated with haptic feedback indicating that wireless scanner has been activated.

18. The system of claim 15, further comprising a wearable item,
wherein the first computing device is detachably mounted to the wearable item.

19. The system of claim 18, further comprising an antenna included in at least a portion of the wearable item,
wherein the wireless scanner transmits the read message for detecting the wireless identifier via the antenna, and
wherein the wireless scanner receives the response message from the wireless identifier via the antenna.

20. The system of claim 15, wherein the specific computer-executable instructions further cause the system to at least, based at least in part on the first value, activate a location service to receive the location of the passively activated switch.

21. The system of claim 15, wherein the wireless identifier is at least one of a near field communication device or a radio frequency identification device.

* * * * *